(12) United States Patent
Mohammad et al.

(10) Patent No.: US 10,002,601 B2
(45) Date of Patent: Jun. 19, 2018

(54) IN-VEHICLE COMMUNICATION SIGNAL PROCESSING

(71) Applicant: QUALCOMM Incorporated, San Diego, CA (US)

(72) Inventors: Asif Mohammad, San Diego, CA (US); Sreekanth Narayanaswamy, San Diego, CA (US); Wade Heimbigner, Vista, CA (US); Erik Visser, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 15/216,577

(22) Filed: Jul. 21, 2016

(65) Prior Publication Data

US 2017/0193976 A1 Jul. 6, 2017

Related U.S. Application Data

(60) Provisional application No. 62/273,369, filed on Dec. 30, 2015.

(51) Int. Cl.

| | |
|---|---|
| *G10K 11/16* | (2006.01) |
| *G10K 11/178* | (2006.01) |
| *H04M 9/08* | (2006.01) |
| *H04R 3/02* | (2006.01) |
| *G10L 21/0208* | (2013.01) |
| *H04M 3/00* | (2006.01) |

(52) U.S. Cl.
CPC ........ *G10K 11/178* (2013.01); *G10L 21/0208* (2013.01); *H04M 9/082* (2013.01); *H04R 3/02* (2013.01); *G10K 2210/12821* (2013.01); *G10L 2021/02082* (2013.01); *H04M 3/002* (2013.01); *H04R 2499/11* (2013.01); *H04R 2499/13* (2013.01)

(58) Field of Classification Search
CPC ....................................................... G10K 11/16
See application file for complete search history.

(56) References Cited

U.S. PATENT DOCUMENTS 9,578,415 B1 * 2/2017 Zhou ..................... H04R 3/005
2005/0058278 A1 3/2005 Gallego et al.
(Continued)

FOREIGN PATENT DOCUMENTS

| EP | 1718103 A1 | 11/2006 |
| EP | 2490218 A1 | 8/2012 |
| WO | 2015091279 A1 | 6/2015 |

OTHER PUBLICATIONS

Foley J.B, "Adaptive Periodic Noise Cancellation for the Control of Acoustic Howling," Jan. 1, 1989, Jan. 1, 1989 (Jan. 1, 1989), pp. 7/1-7/4, XP006525783.

(Continued)

*Primary Examiner* — Olisa Anwah
(74) *Attorney, Agent, or Firm* — Toler Law Group, P.C.

(57) ABSTRACT

A system includes a feedback filter configured to receive an audio signal from a microphone and to process the audio signal based on a feedback path between a loudspeaker and the microphone. The system also includes an adaptive filter coupled to the feedback filter. The system further includes a signal combiner coupled to the microphone and to the adaptive filter.

24 Claims, 7 Drawing Sheets

(56) References Cited

U.S. PATENT DOCUMENTS

| | | | |
|---|---|---|---|
| 2008/0025527 A1* | 1/2008 | Haulick | H04M 9/082 |
| | | | 381/93 |
| 2008/0031468 A1 | 2/2008 | Christoph et al. | |
| 2008/0181420 A1* | 7/2008 | Mohammad | H04M 19/04 |
| | | | 381/66 |
| 2009/0022330 A1 | 1/2009 | Haulick et al. | |
| 2009/0097674 A1 | 4/2009 | Watson et al. | |
| 2012/0170766 A1 | 7/2012 | Alves et al. | |
| 2013/0179163 A1* | 7/2013 | Herbig | H04R 3/005 |
| | | | 704/233 |
| 2016/0119712 A1* | 4/2016 | Tzirkel-Hancock | H04R 1/406 |
| | | | 381/86 |
| 2016/0368430 A1* | 12/2016 | Orellana | B60R 11/0217 |
| 2017/0055078 A1* | 2/2017 | Christoph | H04R 1/025 |

OTHER PUBLICATIONS

International Search Report and Written Opinion—PCT/US2016/067851—ISA/EPO—dated Mar. 31, 2017.
Schmidt G., et al., "Signal Processing for in-car Communication Systems," Signal Processing, Elsevier Science Publishers B.V. Amsterdam, NL, Jun. 1, 2006 (Jun. 1, 2006), vol. 86(6), pp. 1307-1326, XP024997680, ISSN: 0165-1684, DOI: 10.1016/J.SIGPRO.2005.07.040 [retrieved on Jun. 1, 2006].

* cited by examiner

IN-VEHICLE COMMUNICATION SIGNAL PROCESSING

I. CROSS REFERENCE TO RELATED APPLICATIONS

The present application claims the benefit of U.S. Provisional Patent Application No. 62/273,369, entitled "IN-VEHICLE COMMUNICATION SIGNAL PROCESSING," filed Dec. 30, 2015, which is expressly incorporated by reference herein in its entirety.

II. FIELD

The present disclosure is generally related processing of audio signals.

III. DESCRIPTION OF RELATED ART

Communication between people in a vehicle may be hindered due to positioning and orientation of the people within the vehicle, in addition to ambient noise such as wind noise and entertainment audio (e.g., radio).

IV. SUMMARY

According to an aspect of the disclosure, a system includes a feedback filter configured to receive an audio signal from a microphone and to process the audio signal based on a feedback path between a loudspeaker and the microphone. The system also includes an adaptive filter coupled to the feedback filter. The system also includes a signal combiner coupled to the microphone and to the adaptive filter.

In another aspect, an apparatus includes means for processing an audio signal from a microphone of a vehicle to at least partially cancel a feedback portion of the audio signal to generate a filtered signal. The feedback portion corresponds to an output of a loudspeaker of the vehicle. The apparatus includes means for generating a cancellation signal at least partially based on the filtered signal. The apparatus includes means for adaptively filtering the cancellation signal to generate a filtered cancellation signal. The apparatus further includes means for combining the filtered cancellation signal with the audio signal to generate a modified audio signal.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects, advantages, and features of the present disclosure will become apparent after review of the entire application, including the following sections: Brief Description of the Drawings, Detailed Description, and the Claims.

V. BRIEF DESCRIPTION OF THE DRAWING

The foregoing summary, as well as the following detailed description of illustrative implementations, is better understood when read in conjunction with the appended drawings. For the purpose of illustrating the implementations, there are shown in the drawings example constructions of the implementations; however, the implementations are not limited to the specific methods and instrumentalities disclosed. In the drawings.

VI. DETAILED DESCRIPTION

Particular aspects of the present disclosure are described below with reference to the drawings. In the description, common features are designated by common reference numbers throughout the drawings. As used herein, "exemplary" may indicate an example, an implementation, an aspect, or a combination thereof, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

Figure 1:
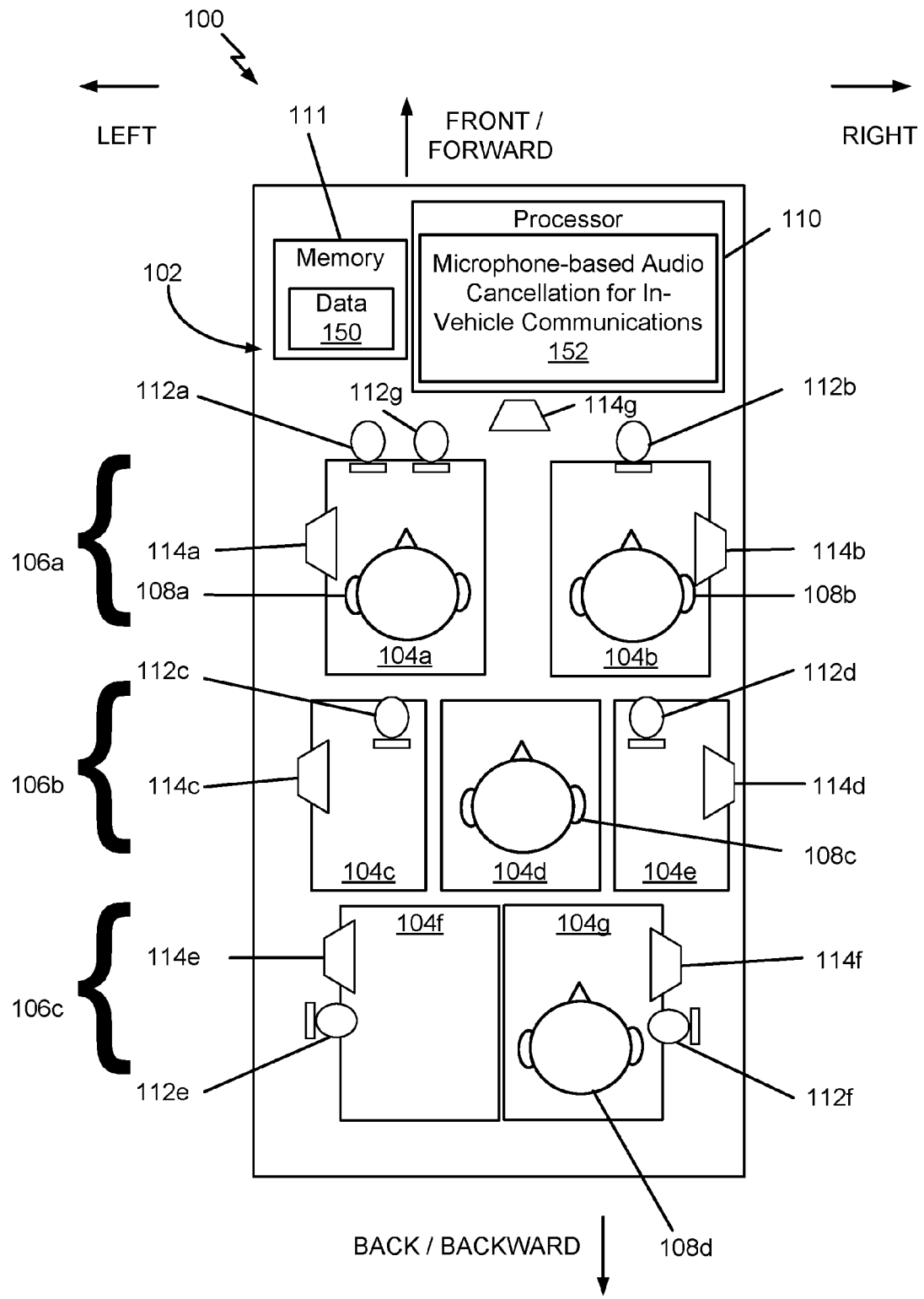
FIG. 1 is a diagram that illustrates a system for in-vehicle communications.

FIG. 1 illustrates a particular example of a system 100 that may be used for communications, such as in-vehicle communications. The system 100 may attenuate non-speech signals received at one or more microphones of a plurality of microphones 112a-112g and may output speech signals at one or more loudspeakers of a plurality of loudspeakers 114a-114g. Attenuation of the non-speech signals may be based on at least partially cancelling audio components from one or more of the loudspeakers. Cancellation of audio components may be based on the audio signal received from the one or more microphones rather than based on audio signals that are input to the loudspeakers.

The system 100 may be included in a shared acoustic space 102. The shared acoustic space 102 may be configured to accommodate one or more people. For example, multiple people may be in close proximity in the shared acoustic space 102. As an example, the shared acoustic space 102 may include or correspond to an interior compartment of a vehicle, such as an automobile, a plane, a ship, or a train. Additionally or alternatively, the shared acoustic space 102 may include or correspond to a non-transportation shared acoustic space. For example, the shared acoustic space may include or correspond to a concert hall, a theatre, a conference room, an office, as illustrative, non-limiting examples.

As described herein with reference to FIG. 1, the shared acoustic space 102 (e.g., an acoustic space) corresponds to the interior compartment of an automobile having seven seats 104a-104g arranged in three zones 106a-106c (e.g., rows). The interior compartment of the vehicle may be separated into (or may include) multiple zones 106a-106c. As described with reference to the system 100, each zone of the multiple zones 106a-106c corresponds to a different row of seats. In other implementation, each zone of multiple zones may correspond to a different seat of the multiple seats 104a-104g.

The seats 104a-104g may be configured to accommodate one person per seat. For example, in the configuration illustrated in FIG. 1, four people 108a-108d are in the shared acoustic space 102 and occupy seats 104a (e.g., a driver's seat), 104b (for a front-seat passenger), 104d (for a middle-row center-seat passenger), and 104g (for a third-row seat passenger on the vehicle-right side). Although the shared acoustic space has been described in terms of having seven seats 104a-104g in three zones (rows) 106a-106c, in other implementations the shared acoustic space 102 may include a different number of seats, a different number of zones (or rows), or a combination thereof. For example, the shared acoustic space 102 may include more than seven seats or fewer than seven seats.

The system 100 may include a processor 110, a memory 111, the plurality of microphones 112a-112g, and the plurality of loudspeakers 114a-114g. Each of the plurality of microphones 112a-112g may be communicatively coupled to the processor 110. The plurality of microphones 112a-112g may be located in the shared acoustic space 102 and may be distributed throughout the shared acoustic space 102. For example, the plurality of microphones 112a-112g may be distributed throughout the shared acoustic space 102; in relation to the seats 104a-104g of the vehicle.

The plurality of microphones 112a-112g may be configured to receive audio inputs. For example, a first microphone 112a may be configured to receive a first audio input and a second microphone 112b may be configured to receive a second audio input. In some implementations, the audio inputs may be associated with the same source (e.g., the same person). For example, the first microphone 112a may receive the first audio input associated with a first person 108a at a first time and the second microphone 112b may receive the second audio input associated with the first person 108a at a second time. In some implementations, the first audio input (e.g., speech from the first person 108a) may have a different amplitude than the second audio input (e.g., the speech from the first person 108a). In other implementations, the audio inputs may be associated with different sources. For example, the first microphone 112a may receive the first audio input associated with the first person 108a and a third microphone 112c may receive a third audio input associated with a third person 108c.

In some implementations, more than one microphone may be provided for the driver, e.g., microphones 112a and 112g. For some implementations, no microphone may be specifically provided for a third person 108c in seat 104d (a middle-row center-seat) which instead may utilize both microphones 112c and 112d where the processor 110 is able to use data from both of these microphones to service all three seated positions in the second zone 106b (and likewise for the other rows if they were to have a third middle seat).

Each of the plurality of loudspeakers 114a-114g may be communicatively coupled to the processor 110. The plurality of loudspeakers 114a-114g may be located within and distributed throughout the shared acoustic space 102. For example, the plurality of loudspeakers 114a-114g may be distributed throughout the shared acoustic space 102 in relation to the seats 104a-104g of the vehicle. Additionally or alternatively, the plurality of loudspeakers 114a-114g may be located in a seat, on a seat, in a headrest, in a steering wheel, in a dashboard, or a combination thereof, as illustrative, non-limiting examples. In some implementations, each seat 104a-104g may include a corresponding loudspeaker. In other implementations, at least one seat, such as the first seat 104a (e.g., a driver's seat), may include multiple loudspeakers.

The memory 111 may be coupled to the processor 110 and may be configured to store data 150, such as processor executable instructions, as an illustrative non-limiting example. The data 150 may include program instructions of a microphone-based audio cancellation for in-vehicle communications module 152 that is executable by the processor 110 to reduce or remove feedback, as described further herein.

The processor 110 may be configured to receive input data associated with the shared acoustic space 102. For example, the processor 110 may be configured to receive the audio signal from (e.g., generated by) the plurality of microphones 112a-112g. The processor 110 may be coupled to the plurality of microphones 112a-112g and the plurality of loudspeakers 114a-114g via a wired connection, a wireless connection, or a combination thereof. For example, the processor 110 may be wirelessly coupled to the plurality of microphones 112a-112g and the plurality of loudspeakers 114a-114g. To illustrate, the processor 110 may be wirelessly coupled to one or more of the plurality microphones 112a-112g using radiofrequency communication, Bluetooth communication, Wi-Fi communication, and other wireless communication technologies, as illustrative, non-limiting examples.

In some implementations, pairs of loudspeakers located in each row, such as loudspeakers 114a and 114b in the first zone 106a (e.g., a first row), may provide multichannel (i.e., stereo) output for a music player. In other implementations, the plurality of loudspeakers 114a-114g may operate to provide surround sound for music, movie soundtracks, or other surround sound media. In some implementations, the processor 110 can balance audio input received from another party during a conference call to indicate a nature and direction of the audio input. For example, the processor 110 may provide audio output via the loudspeakers 114a and 114b to indicate the nature (e.g., the audio originated from the back left) and the direction (e.g., the audio directed at the back right) of the audio input.

Regardless of the specific locations or configuration of the microphones 112a-112g within the shared acoustic space 102, the processor 110 can act to balance sounds across the vehicle by taking sounds generated from any part of the vehicle—received as inputs at one or more of the microphones 112a-112g—and reproducing these sounds on one, a set, or subset of loudspeakers 114a-114g in the other parts of the vehicle akin to a multi-input/multi-output public address system. For example, the microphones 112e and 112f may receive audio inputs from a fourth person 108d in the third zone 106c. The processor 110 may reproduce the audio input as audio output via the loudspeakers in the first zone 106a, such as the loudspeakers 114a, 114b, and 114g. Similarly, the microphones 112a and 112g may receive audio inputs from the first person 108a in the first zone 106a. The processor 110 may reproduce the audio input as audio output via the loudspeakers in the second zone 106b and the third zone 106c, such as the loudspeakers 114c, 114d, 114e, and 114f.

The processor 110 is configured to reduce or eliminate feedback arising from generating an output at a loudspeaker based on audio received at one or more of the microphones 112a-112g, where the output of the loudspeaker is also picked up by the one or more of the microphones. For example, an in-vehicle communication operation may direct speech detected at the first microphone 112a to be output at the loudspeakers of the second zone 106b and the third zone 106c so that occupants of the zones 106b-106c can more clearly hear the first person 108a. However, the first microphone 112a may pick up the outputs of the speakers 114c-114f, resulting in feedback. The processor 110 may include one or more feedback cancellation units that generate cancellation signals based on inputs received from one or more microphones, such as described in further detail with respect to FIGS. 2-4.

In some implementations, the processor 110 may be located in the shared acoustic space 102. For example, the processor 110 may be centrally located in the shared acoustic space 102. As another example, the processor 110 may include multiple processors and the multiple processors may be distributed throughout the shared acoustic space 102. In other implementations, the processor 110 may be located outside of, or remote from, the shared acoustic space 102. Regardless of location, the processor 110 may be operatively coupled (e.g., configured to receive) to receive inputs from the microphones 112a-112g.

During operation of the system 100, the first person 108a seated in a first seat 104a (e.g., the driver seat) may speak. Multiple microphones of the plurality of microphones 112a-112g may receive the speech as audio inputs and provide the audio inputs (or corresponding audio signal) to the processor 110. For example, the first microphone 112a of the plurality of microphones 112a-112g may receive a first audio input that includes speech of the first person 108a and may provide the first audio input to the processor 110 as first audio signal. The processor 110 may generate a first cancellation signal based on the first audio signal and based on acoustic paths between the first microphone 112a and each of the loudspeakers 114c-114f. The processor 110 may combine the first audio signal with the first cancellation signal to reduce or remove components of the first audio signal corresponding to outputs of the loudspeakers 114c-114f.

The microphone 112f may receive a second audio input and may provide the second audio input to the processor 110 as second audio signal. The processor 110 may generate a second cancellation signal based on the second audio signal and based on acoustic paths between the microphone 112f and each of the loudspeakers 114a-114d. The processor 110 may combine the second audio signal with the second cancellation signal to reduce or remove components of the second audio signal corresponding to outputs of the loudspeakers 114a-114d. Examples of systems that may be implemented are described in further detail with reference to FIGS. 2-4.

One advantage provided by at least one of the disclosed aspects is enhanced communication between occupants of the shared acoustic space, such as a driver and passengers of a vehicle. By reducing or removing feedback based on microphone inputs complexity may be reduced as compared to reducing or removing feedback based on loudspeaker outputs. For example, in a system that removes feedback based on loudspeaker outputs, each loudspeaker may receive a different output. Accordingly, such systems may rely on more complex calculations that take into account each different loudspeaker output.

Figure 2:
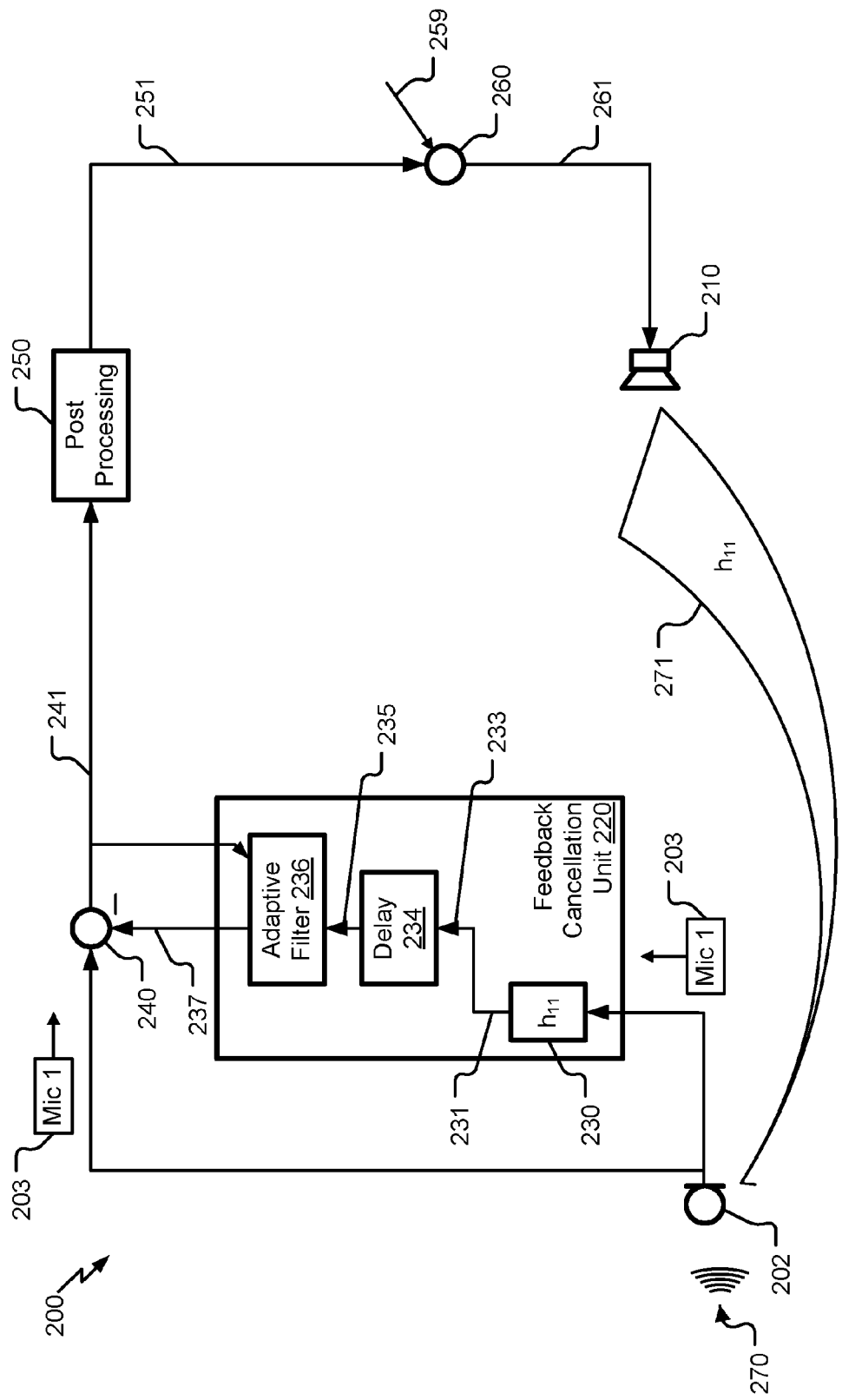
FIG. 2 is a diagram that illustrates a particular example of a system for in-vehicle communications.

FIG. 2 depicts a system 200 including components configured to perform microphone-based feedback cancellation. The system 200 includes a feedback cancellation unit 220 coupled to a microphone 202. A signal combiner 240 is coupled to the microphone 202 and to the feedback cancellation unit 220. The signal combiner 240 is coupled to a loudspeaker 210 via a post processor 250 and an adder 260. In a particular implementation, one or more components of the system 200 may be implemented in the system 100 of FIG. 1. For example, the feedback cancellation unit 220, the post processor 250, the combiner 240, and the adder 260 may be implemented as dedicated circuitry or other hardware of the system 100, as components of the microphone-based audio cancellation module 152, or a combination thereof.

The feedback cancellation unit 220 includes a feedback filter 230 configured to receive an audio signal 203 from the microphone 202 and to process the audio signal based on a feedback path 271 between the loudspeaker 210 and the microphone 202. As used herein, a feedback path may refer to an acoustic path between a loudspeaker and a microphone. In general, such an acoustic path may be characterized based on an impulse response of the acoustic path. For example, the feedback path 271 may include an acoustic path between the loudspeaker 210 and the microphone 202. The acoustic path may be characterized based on a response of the acoustic path to an impulse or other test or calibration signal produced by the loudspeaker 210. The acoustic path may further be based on an environment (e.g., air, objects, etc.) associated with the system 100. To illustrate, the acoustic path may be affected by air pressure of air through which sound waves output by the loudspeaker 210 travel to the microphone 202. As a further example, the acoustic path may be affected by objects included in the environment, such as car seats, etc., that are included in or positioned proximate to the system 100 (e.g., the loudspeaker 210 and the microphone 202). The feedback filter 230 is configured to modify the audio signal 203 based on a transfer characteristic "$h_{11}$" corresponding to the feedback path 271 between the loudspeaker 210 and the microphone 202. For example, the transfer characteristic $h_{11}$ may be measured (e.g., an impulse response or other characteristic of the acoustic path between the speaker 210 and the microphone 202 may be measured) or otherwise determined or estimated, such as part of a periodic, occasional, or event-triggered calibration process performed by the processor 110 of FIG. 1, by transmitting a test signal via the loudspeaker 210 and comparing the transmitted test signal to a received version of the test signal that is received at the microphone 202. A transfer characteristic of the feedback filter 230 may be updated based on the transfer characteristic $h_{11}$ so that applying the audio signal 203 to an input of the feedback filter 230 generates a filtered signal 231 that emulates the audio signal 203 after propagation along the feedback path 271 from the loudspeaker 210 to the microphone 202.

Alternatively, the feedback filter 230 may introduce a delay amount associated with signal propagation along the feedback path 271 from the loudspeaker 210 to the microphone 202 without introducing other transfer characteristics of the feedback path 271. For example, the feedback filter 230 may generate the feedback signal 231 as a delayed version of the audio signal 203 without also introducing modifications to the audio signal 203 due to signal attenuation, reflections, etc., of the feedback path 271. Although configuring the feedback filter 230 based on the transfer characteristic $h_{11}$ may provide more accurate feedback cancellation, configuring the feedback filter 230 as a delay element reduces complexity and provides a reduced signal processing load.

An adaptive filter 236 is coupled to the feedback filter 230, such as via a delay element 234. The delay element 234 is configured to introduce additional delay, such as a delay that may correspond to a signal processing delay, a signal propagation delay, or both, that occurs between receiving an input signal at the microphone 202 and outputting a resulting output signal at the loudspeaker 210. For example, the delay element 234 is configured to receive a cancellation signal 233 (e.g., the filtered signal 231) and to generate a delayed version 235 of the cancellation signal 233. Although the filtered signal 231 and the cancellation signal 233 may correspond to the same signal in FIG. 2, in other implementations the filtered signal 231 may differ from the cancellation signal 233, such as described with reference to FIGS. 3-4.

The delayed version 235 of the cancellation signal 233 is filtered by the adaptive filter 236 to generate a filtered cancellation signal 237. The filtered cancellation signal 237 may substantially match a feedback signal that would be received at the microphone 202 that results from the audio signal 203 being processed and output at the loudspeaker 210. An output of the adaptive filter 236 is coupled to an inverting input of the combiner 240 to subtract the filtered cancellation signal 237 from the audio signal 203 to generate a modified audio signal 241.

The post processor 250 is coupled to an output of the combiner 240 and configured to process the modified audio signal 241. For example, the post processor 250 may perform filtering, balancing, one or more other signal processing operations, or a combination thereof, to generate a processed signal 251.

The adder 260 may be coupled to receive the processed signal 251 from the post processor 250 and to receive a surround sound signal 259 for the loudspeaker 210, such as from a surround sound signal generator of a vehicle entertainment system. The adder 260 is configured to combine the processed signal 251 and the surround sound signal 259 to generate an output signal 261 that is provided to the loudspeaker 210.

During operation, the microphone 202 may generate the audio signal 203 that includes a speech component corresponding to audible speech 270 detected by the microphone 202. For example, the microphone 202 may correspond to the microphone 112a of FIG. 1 and the speech 270 may correspond to speech of the first person 108a.

The audio signal 203 may represent a sequence of digital audio samples that is routed to the combiner 240 and to an input of the feedback cancellation unit 220. For clarity of explanation, the audio signal 203 is described as beginning at time t=t0, such as in response to the speech 270 being detected. In this case, the filtered cancellation signal 237 that is received at the combiner 240 concurrently with the beginning of the audio signal 203 (e.g., at time t0) may be a "zero" signal. The audio signal 203 is processed at the post processor 250, combined with the surround sound signal 259, and the resulting output signal 261 is output by the loudspeaker, e.g., at time t=t1.

The audible signal output by the loudspeaker 210 at time t1, including the speech 270 from time t0 and the surround sound, is received at the microphone 202 via the feedback path 271 at time t=t2, combined with a portion of the speech 270 received at the microphone 202 at time t2, and provided to the combiner 240. Also at time t2, the filtered cancellation signal 237, corresponding to the speech from time t0 that has been filtered and delayed, is provided to the inverting input of the combiner 240. The filtered cancellation signal 237 received at the combined 240 at time t2 substantially cancels the component of the audio signal 203 that corresponds to the speech 270 from time t0 that was played back by the loudspeaker 210.

FIG. 2 depicts an example implementation of the system 200 and various modifications to the system 200 may be implemented. For example, although FIG. 2 illustrates the adder 260 receiving the surround sound signal 259, in other implementations the adder 260 may receive another type of signal or may be omitted from the system 200. As another example, although the feedback filter 230 is described as being updated based on measurements of the transfer characteristic $h_{11}$, in other implementations the feedback filter 230 may be configured to remain in a pre-set or default configuration without updates. As another example, although the feedback cancellation unit 220 is depicted as including the delay element 234, in other implementations the delay element 234 may be omitted as a distinct element and a delay may instead be incorporated in the feedback filter 230, the adaptive filter 236, or both. Although FIG. 2 illustrates a single microphone and a single loudspeaker, alternate arrangements of microphones and loudspeakers may be implemented, such as described with respect to FIGS. 3-4.

Figure 3:
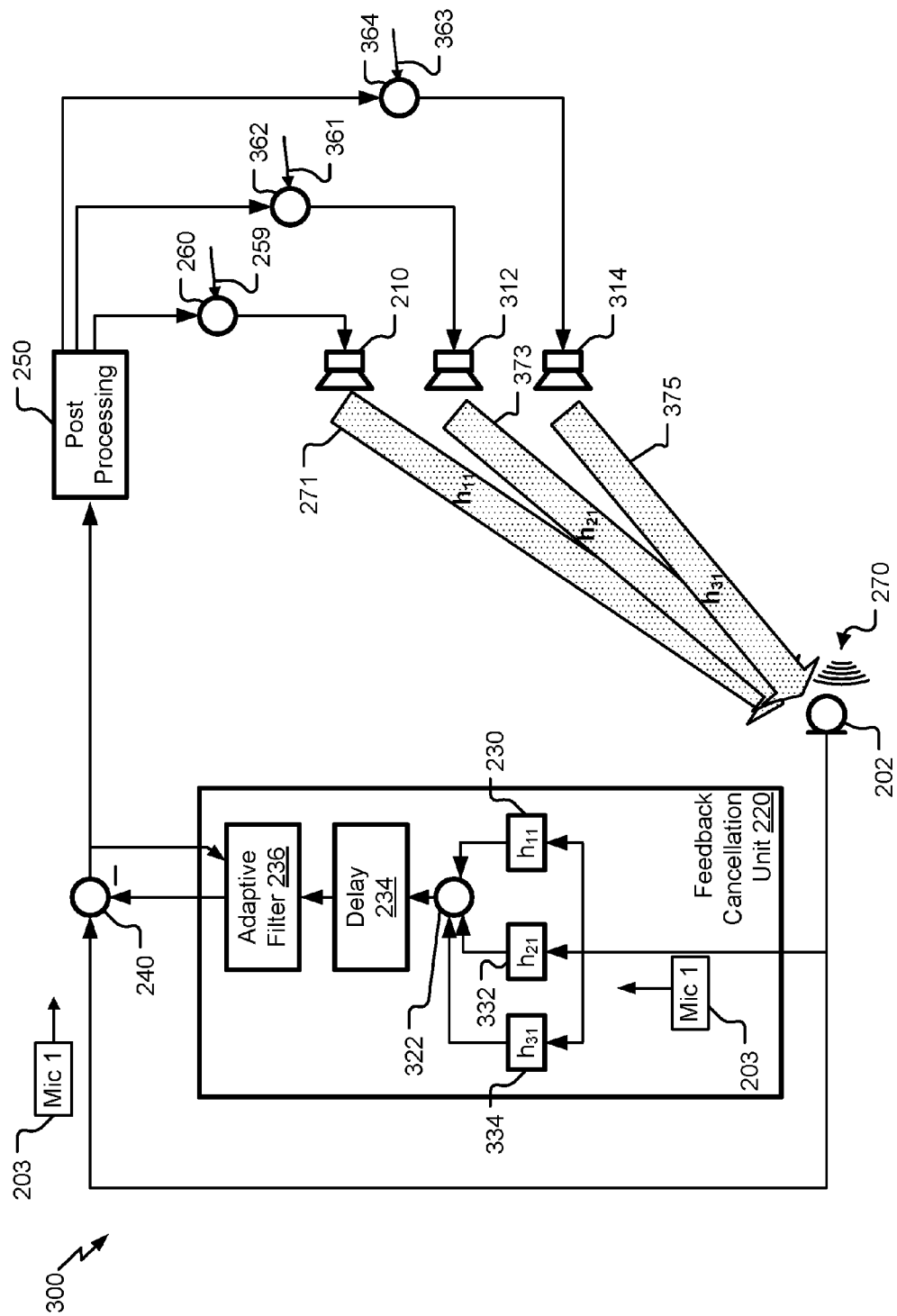
FIG. 3 is a diagram illustrating another example of a system for in-vehicle communications.

FIG. 3 depicts a system 300 that includes components of the system 200 configured to provide feedback reduction or cancellation in a multiple speaker configuration. In the system 300, the post processor 250 generates a first output for the loudspeaker 210 ("the first loudspeaker 210"), a second output for a second loudspeaker 312, and a third output for a third loudspeaker 314.

The adder 260 ("the first adder 260") may have a first input coupled to an output of the signal combiner 240 (e.g., via the post processor 250), a second input coupled to receive the surround sound signal 259 ("the first surround sound signal 259"), and an output coupled to the first loudspeaker 210. A second adder 362 may have a first input coupled to the signal combiner 240 via the post processor 250, a second input coupled to receive a second surround sound signal 361, and an output coupled to the second loudspeaker 312. A third adder 364 may have a first input coupled to the signal combiner 240 via the post processor 250, a second input coupled to receive a third surround sound signal 363, and an output coupled to the third loudspeaker 314.

The feedback cancellation unit 220 includes the feedback filter 230 ("the first feedback filter 230") and also includes a second feedback filter 332 and a third feedback filter 334 coupled to the adaptive filter 236, such as via a combiner 322 and the delay element 234. The second feedback filter 332 is configured to process the audio signal 203 responsive to a second feedback path 373 between the second loudspeaker 312 and the microphone 202. The third feedback filter 334 is configured to process the audio signal 203 responsive to a third feedback path 375 between the third loudspeaker 314 and the microphone 202. Outputs of the feedback filters 230, 332, and 334 are combined at the combiner 322 to generate a cancellation signal that is input to the delay element 234.

The first feedback filter 230 may be configured to have the first transfer characteristic $h_{11}$ corresponding to the first feedback path 271 between the first loudspeaker 210 and the microphone 202. The second feedback filter 332 may be configured to have a second transfer characteristic "$h_{21}$" corresponding to the second feedback path 373 between the second loudspeaker 312 and the microphone 202. The third feedback filter 334 may be configured to have a third transfer characteristic "$h_{31}$" corresponding to the third feedback path 375 between the third loudspeaker 314 and the microphone 202. Alternatively, the first feedback filter 230 may be configured to apply a first delay corresponding to a first feedback path 271, the second feedback filter may be configured to apply a second delay corresponding to the second feedback path 373, the third feedback filter 334 may be configured to apply a third delay corresponding to the third feedback path 375, or any combination thereof.

Because the feedback cancellation unit 220 includes multiple distinct feedback filters 230, 332, 334 each configured to emulate a feedback path for a corresponding one of the loudspeakers 210, 312, and 314, respectively, a more accurate feedback cancellation signal may be generated as compared to using a single filter (e.g., as depicted in the system 200 of FIG. 2) to compensate for feedback from the multiple loudspeakers 210, 312, and 314.

Although three loudspeakers are illustrated, in other implementations the system 300 may two loudspeakers or more than three loudspeakers. In such implementations, the feedback cancellation unit 220 may include a number of feedback filters equal to the number of loudspeakers that form feedback loops with the microphone 202. In addition, or alternatively, one or more additional microphones may be implemented, such as depicted in FIG. 4.

Figure 4:
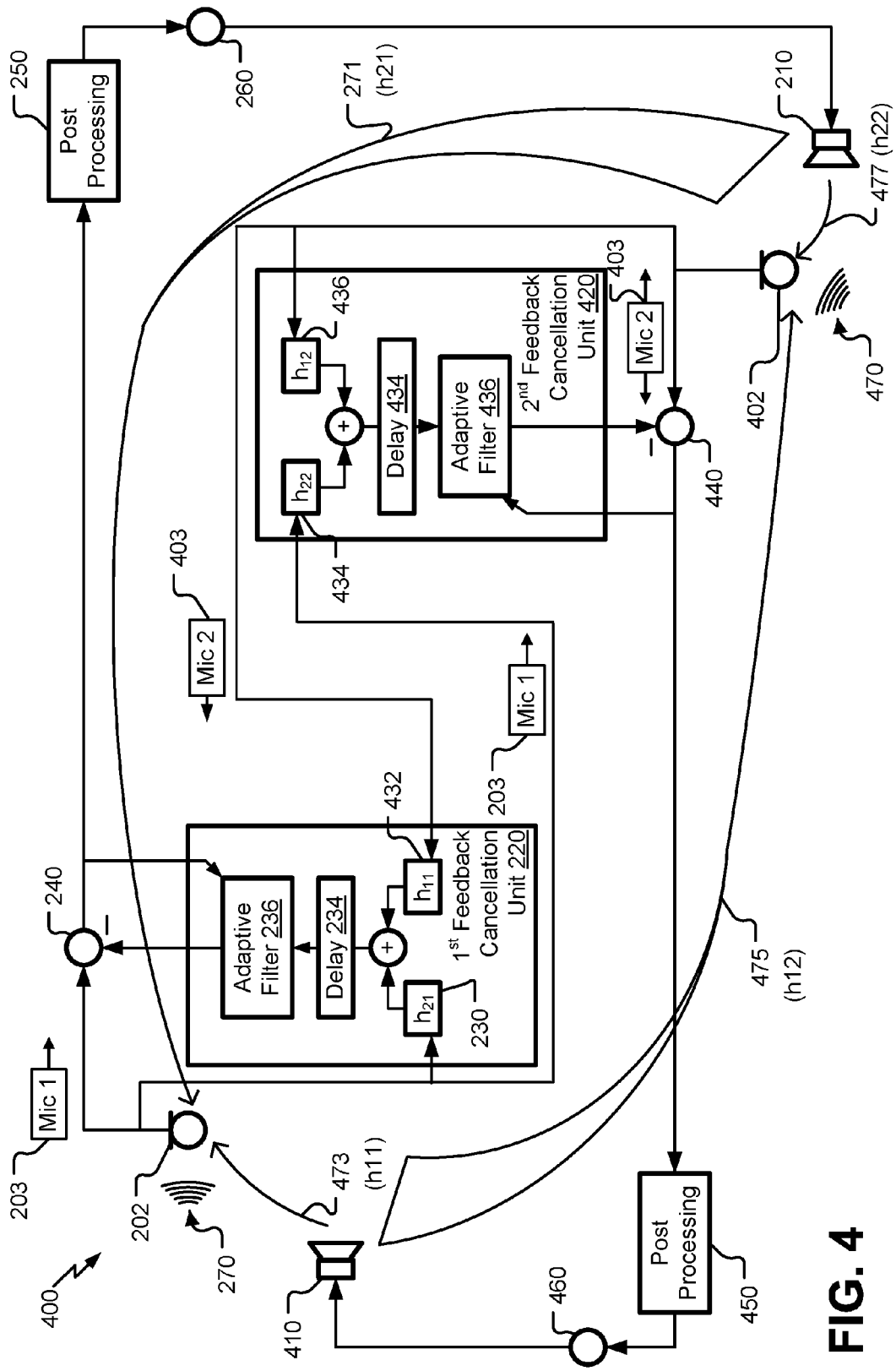
FIG. 4 is a diagram illustrating another example of a system for in-vehicle communications.

FIG. 4 depicts a system 400 that includes components of the system 200 configured to provide feedback reduction or cancellation in a multiple microphone, multiple speaker configuration. In the system 400, a second microphone 402 generates second audio signal 403. A second filtered cancellation signal output by a second feedback cancellation unit 420 is subtracted from the second audio signal. A second post processor 450 processes a signal generated at the second combiner 440 and provides a second processed signal to a second adder 460. The second adder 460 may add a surround sound signal for a second loudspeaker 410 to the second processed signal to generate an output signal for the second loudspeaker 410.

The first microphone 202 may correspond to the microphone 112a, the second loudspeaker 410 may correspond to the loudspeaker 114a, and the speech 270 may be received from the first person 108a of FIG. 1. The second microphone 410 may correspond to the microphone 112f, the first loudspeaker 210 may correspond to the loudspeaker 114f, and second speech 470 may be received at the second microphone 410 from the fourth person 108d of FIG. 1.

The first microphone 202 may receive an audio signal output by the first loudspeaker 210 via the feedback path 271 having a transfer characteristic "$h_{21}$" and may receive an audio signal output by the second loudspeaker 410 via a feedback path 473 having a transfer characteristic "$h_{11}$". The second microphone 402 may receive an audio signal output by the second loudspeaker 410 via a feedback path 475 having a transfer characteristic "$h_{12}$" and may receive an audio signal output by the first loudspeaker 210 via a feedback path 477 having a transfer characteristic "$h_{22}$".

The feedback cancellation unit 220 includes the first feedback filter 230 configured to process the first audio signal 203 responsive to the feedback path 271 between the first loudspeaker 210 and the first microphone 202. The feedback cancellation unit 220 also includes a second feedback filter 432 configured to process the second audio signal 403 responsive to the feedback path 473.

The second feedback cancellation unit 420 includes a third feedback filter 434 configured to process the audio signal 203 responsive to the feedback path 477. The second feedback cancellation unit 420 includes a fourth feedback filter 436 configured to process the audio signal 403 responsive to the feedback path 475. A second adaptive filter 436 is coupled to the third feedback filter 434 and the fourth feedback filter 436 via a second delay element 434 and a combiner. Components of the second feedback cancellation unit 420 may operate in a substantially similar manner as described with respect to corresponding components of the first feedback cancellation unit 220.

Although specific illustrative examples are provided in FIGS. 2-4, it should be understood that any number of microphones and any number of loudspeakers may be accommodated via extension of the illustrated examples. For example, an in-vehicle communication system may include a distinct feedback cancellation unit for each microphone of the system, and each feedback cancellation unit for a particular microphone may include a distinct feedback filter for each loudspeaker having a feedback path to the particular microphone. However, in other implementations, complexity may be further reduced by omitting one or more feedback filters a feedback cancellation unit, such as when an amount of attenuation occurring along a feedback path exceeds a threshold amount of attenuation. In addition, it should be understood that other components (e.g., amplifiers to drive signals to loudspeakers) may be included in particular implementations although not specifically illustrated in the accompanying figures.

Figure 5:
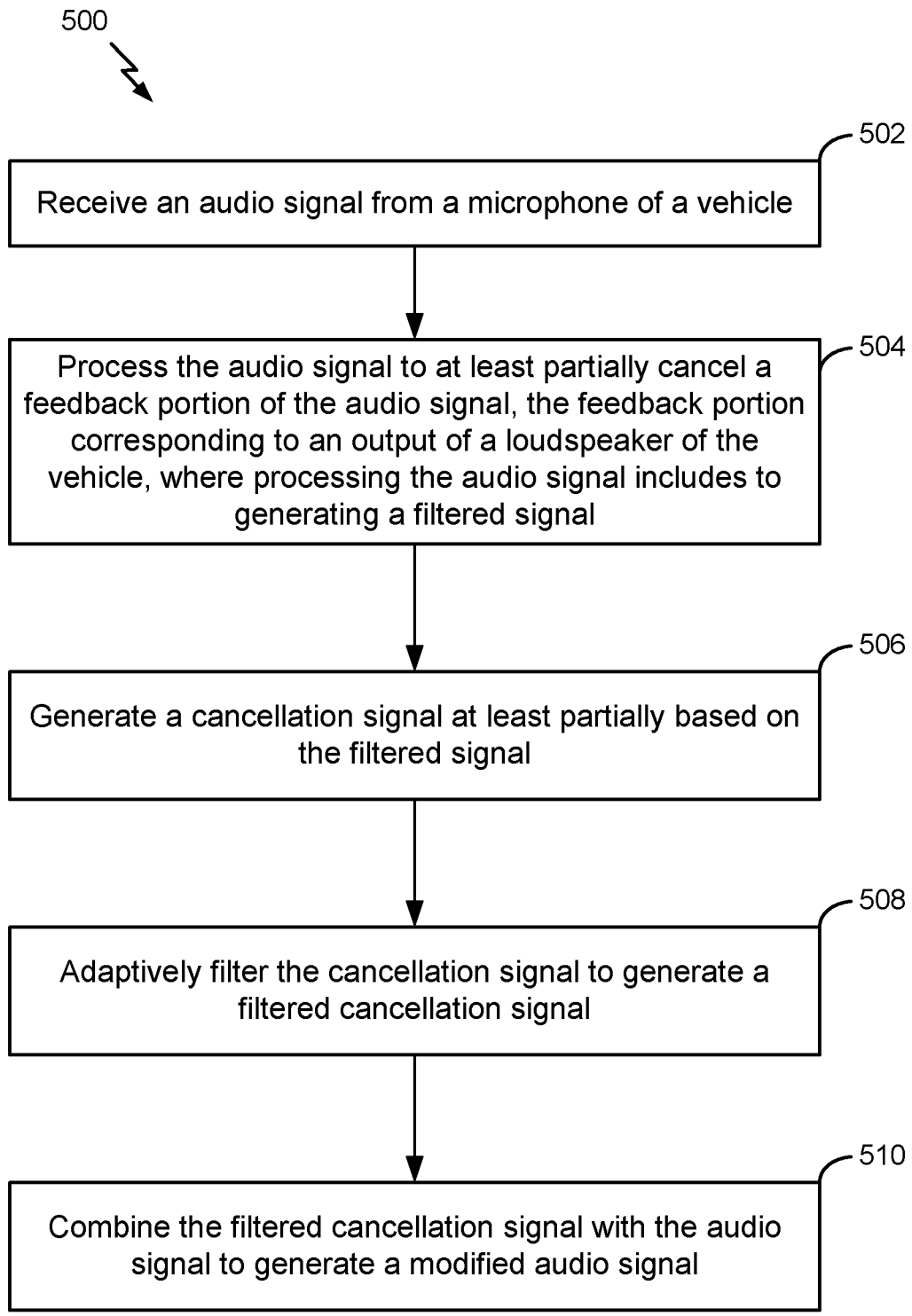
FIG. 5 is a flowchart that illustrates an example of a method for in-vehicle communication.

FIG. 5 illustrates a particular example of a method 500 for in-vehicle communication. The method 500 may be performed by one or more of the systems described above, such as the processor 110 of FIG. 1 implementing one or more of the systems of FIGS. 2-4. In a particular implementation, the method 500 may be performed by one or more of the systems described above, such as the system 100 of FIG. 1, the system 200 of FIG. 3, the system 300 of FIG. 3, or a combination thereof.

The method 500 includes receiving an audio signal, such as the audio signal 203, from a microphone of a vehicle, at 502. The audio signal is processed to at least partially cancel a feedback portion of the audio signal. The feedback portion corresponds to an output of a loudspeaker of the vehicle. Processing the audio signal includes generating a filtered signal (e.g., the filtered signal 231 of FIG. 2), at 504, generating a cancellation signal (e.g., the cancellation signal 233 of FIG. 2) at least partially based on the filtered signal, at 506, and generating a filtered cancellation signal (e.g., the filtered cancellation signal 237 of FIG. 2), at 508.

The filtered cancellation signal is combined (e.g., at the combiner 240) with the audio signal to generate a modified audio signal, at 510. In a particular aspect, combining the filtered cancellation signal with the audio signal attenuates one or more loudspeaker output signals that are received at the microphone without substantial attenuation of a voice portion of the audio signal. Attenuation of the one or more loudspeaker output signal without substantial attenuation of the voice portion may enhance a clarity of reproduction of the voice portion of the audio signal at the loudspeaker.

The microphone may be at a first location proximate to a first occupant of the vehicle, and the audio signal may include a voice portion that corresponds to speech of the first occupant. The loudspeaker may be at a second location proximate to a second occupant of the vehicle, and the input signal may cause the loudspeaker to output a synthesized version of the speech of the first occupant at the second location proximate to the second occupant.

The modified audio signal may be processed to generate an input signal for the loudspeaker. Processing the modified audio signal may include adding a surround sound component for the loudspeaker to the modified audio signal. Processing the modified audio signal may also include at least partially cancelling a second feedback portion of the audio signal to generate a second filtered signal. The second feedback portion may correspond to an output of a second loudspeaker of the vehicle. The cancellation signal may be further based on the second filtered signal. Processing the modified audio signal may also include adding a second surround sound component for the second loudspeaker to the modified audio signal.

In a particular aspect, processing the audio signal may include filtering the audio signal at a first filter having a first transfer characteristic corresponding to a first feedback path between the loudspeaker and the microphone to generate the filtered signal (e.g., at the first feedback filter 230 of FIG. 3). Processing the audio signal may also include filtering the audio signal at a second filter having a second transfer characteristic corresponding to a second feedback path between the second loudspeaker and the microphone to generate a second filtered signal (e.g., at the second feedback filter 332 of FIG. 3). The filtered signal and the second filtered signal may be combined.

In another particular aspect, processing the audio signal includes delaying the audio signal with a first delay corresponding to a first feedback path between the loudspeaker and the microphone to generate the filtered signal. The audio signal may also be delayed using a second delay corresponding to a second feedback path between the second loudspeaker and the microphone to generate a second filtered signal, and the filtered signal and the second filtered signal may be combined.

Because the audio signal from the microphone is used to generate the filtered signal(s) and the cancellation signal, contributions of one or more loudspeakers to the audio signal may be at least partially filtered from the audio signal based on an acoustic channel between the loudspeaker and the microphone. Generating cancellation signals based on microphone inputs, rather than on loudspeaker outputs, reduces complexity of noise cancellation in systems that include multiple loudspeakers that each generate distinct audio content in the proximity of multiple microphones, such as surround-sound entertainment systems.

Figure 6:
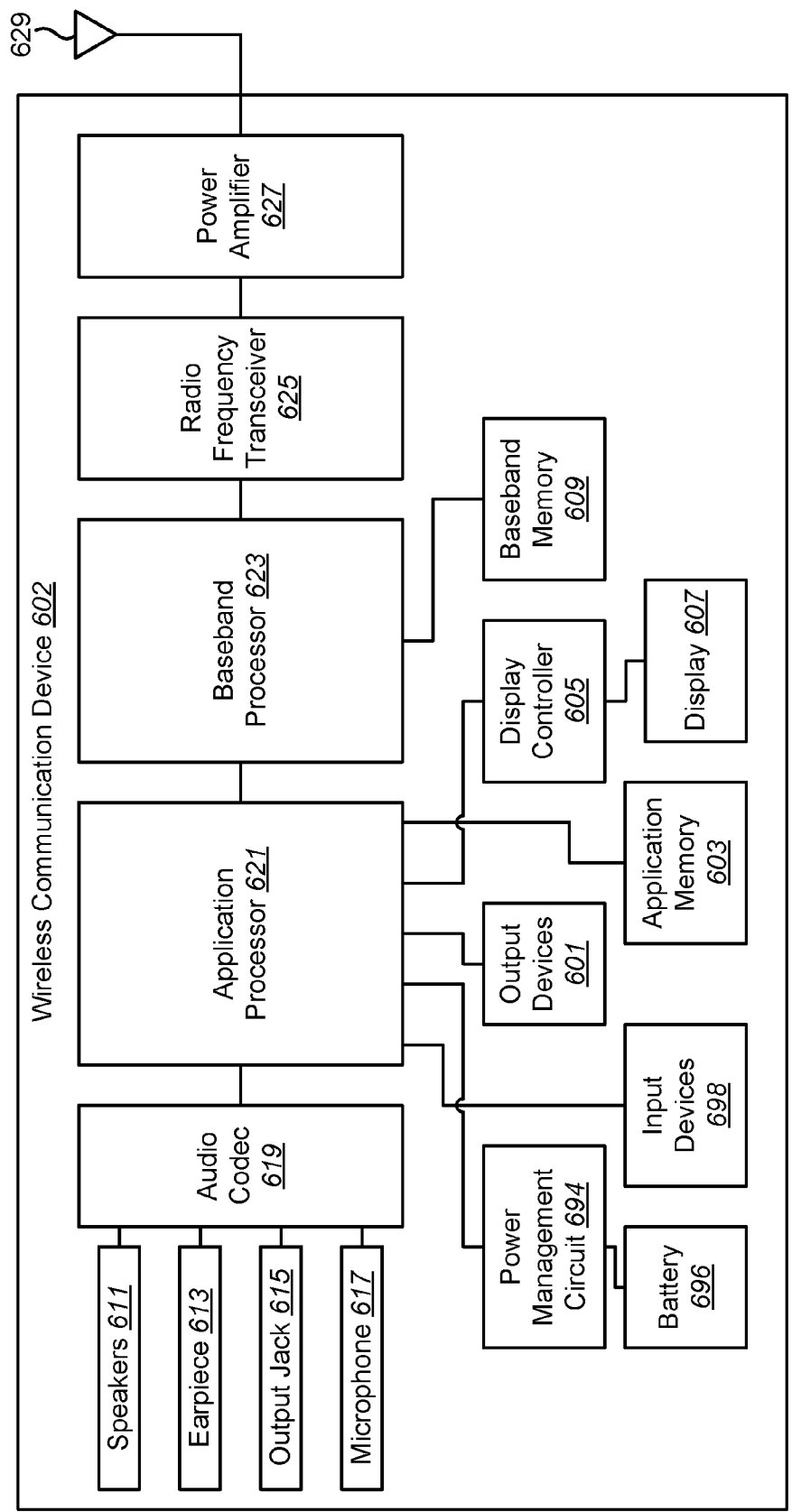
FIG. 6 is a diagram of a wireless device that is operable to support various implementations of one or more methods, systems, apparatuses, and computer-readable media disclosed herein.

FIG. 6 is a block diagram illustrating one configuration of a wireless communication device 602 in which aspects of various implementations herein disclosed may utilize or be implemented (at least in part). The wireless communication device 602 illustrated in FIG. 6 may be an example of one or more of the electronic devices described herein. The wireless communication device 602 may include an application processor 621. The application processor 621 generally processes instructions (e.g., runs programs) to perform functions on the wireless communication device 602. The application processor 621 may be coupled to an audio coder/decoder (codec) 619.

The audio codec 619 may be used for coding audio signals, decoding audio signals, or a combination thereof. The audio codec 619 may be coupled to at least one speaker 611, an earpiece 613, an output jack 615, at least one microphone 617, or a combination thereof. The speakers 611 may include one or more electro-acoustic transducers that convert electrical or electronic signals into acoustic signals. For example, the speakers 611 may be used to play music or output a speakerphone conversation, etc. The earpiece 613 may be another speaker or electro-acoustic transducer that can be used to output acoustic signals (e.g., speech signals) to a user. For example, the earpiece 613 may be used such that only a user may reliably hear the acoustic signal. The output jack 615 may be used for coupling other devices to the wireless communication device 602 for outputting audio, such as headphones. The speakers 611, the earpiece 613, the output jack 615, or a combination thereof, may generally be used for outputting an audio signal from the audio codec 619. The at least one microphone 617 may be an acousto-electric transducer that converts an acoustic signal (such as a user's voice) into electrical or electronic signals that are provided to the audio codec 619.

The application processor 621 may also be coupled to a power management circuit 694. One example of a power management circuit 694 is a power management integrated circuit (PMIC), which may be used to manage the electrical power consumption of the wireless communication device 602. The power management circuit 694 may be coupled to a battery 696. The battery 696 may generally provide electrical power to the wireless communication device 602. For example, the battery 696, the power management circuit 694, or a combination thereof, may be coupled to at least one of the elements included in the wireless communication device 602.

The application processor 621 may be coupled to at least one input device 698 for receiving input. Examples of input devices 698 include infrared sensors, image sensors, accelerometers, touch sensors, keypads, etc. The input devices 698 may allow user interaction with the wireless communication device 602. The application processor 621 may also be coupled to one or more output devices 601. Examples of output devices 601 include printers, projectors, screens, haptic devices, etc. The output devices 601 may allow the wireless communication device 602 to produce output that may be experienced by a user.

The application processor 621 may be coupled to application memory 603. The application memory 603 may be any electronic device that is capable of storing electronic information. Examples of application memory 603 include double data rate synchronous dynamic random access memory (DDRAM), synchronous dynamic random access memory (SDRAM), flash memory, etc. The application memory 603 may provide storage for the application processor 621. For instance, the application memory 603 may store data, instructions, or a combination thereof, for the functioning of programs that are run on the application processor 621, or a combination thereof.

The application processor 621 may be coupled to a display controller 605, which in turn may be coupled to a display 607. The display controller 605 may be a hardware block that is used to generate images on the display 607. For example, the display controller 605 may translate instructions, data, or a combination thereof, from the application processor 621 into images that can be presented on the display 607. Examples of the display 607 include liquid crystal display (LCD) panels, light emitting diode (LED) panels, cathode ray tube (CRT) displays, plasma displays, etc.

The application processor 621 may be coupled to a baseband processor 623. The baseband processor 623 generally processes communication signals. For example, the baseband processor 623 may demodulate, decode, or a combination thereof, received signals. Additionally or alternatively, the baseband processor 623 may encode, modulate, or a combination thereof, signals in preparation for transmission.

The baseband processor 623 may be coupled to baseband memory 609. The baseband memory 609 may be any electronic device capable of storing electronic information, such as SDRAM, DDRAM, flash memory, etc. The baseband processor 623 may read information (e.g., instructions, data, or a combination thereof) from, write information to, or a combination thereof, the baseband memory 609. Additionally or alternatively, the baseband processor 623 may use instructions, data, or a combination thereof, stored in the baseband memory 609 to perform communication operations.

The baseband processor 623 may be coupled to a radio frequency (RF) transceiver 625. The RF transceiver 625 may be coupled to a power amplifier 627 and one or more antennas 629. The RF transceiver 625 may transmit, receive, or a combination thereof, radio frequency signals. For example, the RF transceiver 625 may transmit an RF signal using a power amplifier 627 and at least one antenna 629. The RF transceiver 625 may also receive RF signals using the one or more antennas 629.

Additionally, the various implementations disclosed herein may comprise components of an electronic device or "computer" and its associated components; may themselves be a component of a larger, more comprehensive electronic device; or may be extended to include features of electronic devices with regard to memory, processing, storage, communications, and so forth. Likewise, various such implementations may also comprise computer-readable media having computer-readable instructions.

Figure 7:
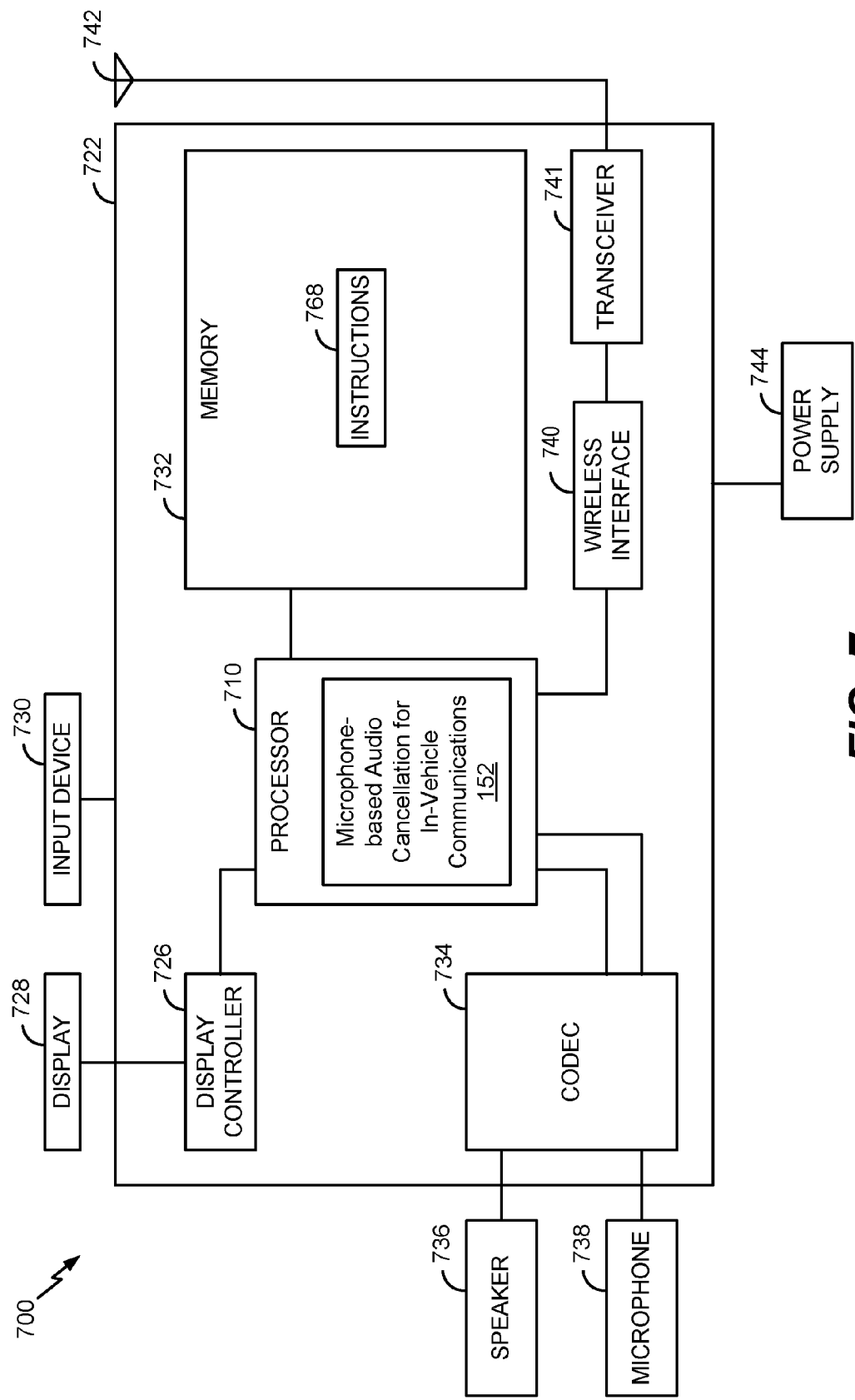
FIG. 7 is a diagram of another wireless device that is operable to support various implementations of one or more methods, systems, apparatuses, and computer-readable media disclosed herein.

Referring to FIG. 7, a particular illustrative implementation of a wireless communication device is depicted and generally designated 700. The device 700 includes a processor 710, such as a digital signal processor, coupled to a memory 732. The device 700, or components thereof, may include or correspond to the system 100 of FIG. 1, the system 200 of FIG. 2, the system 300 of FIG. 3, the system 400 of FIG. 4, or components thereof.

Memory 732, such as a non-transitory computer readable medium (e.g., a computer readable storage device), may include instructions 768 that may be executable by the processor 710. For example, the memory 732 may include or correspond to the memory 111 of FIG. 1.

The processor 710 may be configured to execute software (e.g., a program of one or more instructions 768) stored in the memory 732. For example, the processor 710 may be configured to execute the microphone-based audio cancellation module 152 of FIG. 1, to implement one or more of the feedback cancellation units of FIGS. 2-4, to operate in accordance with the method 500 of FIG. 5, or a combination thereof.

FIG. 7 also shows a display controller 726 that is coupled to the processor 710 and to a display 728. A coder/decoder (CODEC) 734 can also be coupled to the processor 710. A speaker 736 and a microphone 738 can be coupled to the CODEC 734. The speaker 736 may include or correspond to one or more of the plurality of loudspeakers 114a-114f of FIG. 1. The microphone 738 may include or correspond to one or more of the plurality of microphones 112a-112g of FIG. 1.

FIG. 7 also indicates that a wireless interface 740 can be coupled to the processor 710 and to an antenna 742. For example, the wireless interface 740 may be coupled to the antenna 742 via a transceiver 741. The transceiver 741 may include a transmitter, a receiver, or both.

In some implementations, the processor 710, the display controller 726, the memory 732, the CODEC 734, the wireless interface 740, and the transceiver 741 are included in a system-in-package or system-on-chip device 722. In a particular implementation, an input device 730 and a power supply 744 are coupled to the system-on-chip device 722. Moreover, in another particular implementation, as illustrated in FIG. 7, the display 728, the input device 730, the speaker 736, the microphone 738, the antenna 742, and the power supply 744 are external to the system-on-chip device 722. However, each of the display 728, the input device 730, the speaker 736, the microphone 738, the antenna 742, and the power supply 744 can be coupled to a component of the system-on-chip device 722, such as an interface or a controller.

The various components of the electronic device 700 may be coupled together by one or more buses, which may include a power bus, a control signal bus, a status signal bus, a data bus, etc. For example, the various buses may couple the processor 710 and the memory 732 together.

In conjunction with one or more of the described aspects of FIGS. 1-7, a system is disclosed that may include means for processing an audio signal from a microphone of a vehicle to at least partially cancel a feedback portion of the audio signal, the feedback portion corresponding to an output of a loudspeaker of the vehicle. For example, the means for processing may correspond to the feedback cancellation unit 220 of FIG. 2.

The means for processing may include means for generating a filtered signal, such as the feedback filter 230 of FIG. 2. The means for processing may include means for generating a cancellation signal at least partially based on the filtered signal, such as the delay element 234 of FIG. 2. The means for processing may include means for adaptively filtering the cancellation signal to generate a filtered cancellation signal, such as the adaptive filter 236 of FIG. 2.

The system may also include means for combining the filtered cancellation signal with the audio signal to generate a modified audio signal, such as the combiner 240 of FIG. 2.

One or more of the disclosed implementations may be implemented in a system or an apparatus, such as the electronic device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the electronic device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Although one or more of FIGS. 1-7 may illustrate systems, apparatuses, methods, or a combination thereof, according to the teachings of the disclosure, the disclosure is not limited to these illustrated systems, apparatuses, methods, or a combination thereof. One or more functions or components of any of FIGS. 1-7 as illustrated or described herein may be combined with one or more other portions of another function or component of FIGS. 1-7. Accordingly, no single implementation described herein should be construed as limiting and implementations of the disclosure may be suitably combined without departing from the teachings of the disclosure.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal. The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A system comprising:
    a feedback filter configured to receive an audio signal from a microphone and to process the audio signal based on a feedback path between a loudspeaker and the microphone;
    a second feedback filter configured to receive the audio signal from the microphone and to process the audio signal based on a second feedback path between a second loudspeaker and the microphone, wherein the second feedback path is distinct from the feedback path;
    an adaptive filter coupled to the feedback filter and to the second feedback filter; and
    a signal combiner coupled to the microphone and to the adaptive filter.

2. The system of claim 1, wherein the feedback filter is configured to apply a first delay corresponding to the feedback path between the loudspeaker and the microphone, and wherein the second feedback filter is configured to apply a second delay corresponding to the second feedback path between the second loudspeaker and the microphone.

3. The system of claim 1, further comprising:
    a first adder having a first input coupled to an output of the signal combiner, a second input configured to receive a first surround sound signal, and an output coupled to the loudspeaker; and
    a second adder having a first input coupled to the signal combiner, a second input configured to receive a second surround sound signal, and an output coupled to the second loudspeaker.

4. The system of claim 1, further including a third feedback filter configured to process a second audio signal responsive to a third feedback path between a third loudspeaker and the microphone, and wherein the adaptive filter is further coupled to the third feedback filter.

5. The system of claim 4, wherein the feedback filter, the second feedback filter, the third feedback filter, the adaptive filter, and the signal combiner are included in a feedback cancellation unit, and further comprising a second feedback cancellation unit coupled to a second microphone, wherein the second feedback cancellation unit comprises:
    a fourth feedback filter configured to process the audio signal responsive to a fourth feedback path between the loudspeaker and the second microphone;
    a fifth feedback filter configured to process the second audio signal responsive to a fifth feedback path between the third loudspeaker and the second microphone; and
    a second adaptive filter coupled to the third feedback filter and the fourth feedback filter; and
    a second signal combiner coupled to the second microphone and to the second feedback cancellation unit.

6. The system of claim 1, wherein the adaptive filter is coupled to the feedback filter via a delay element.

7. The system of claim 1, wherein the feedback path includes an acoustic path between the loudspeaker and the microphone, and wherein the feedback filter is configured to process the audio signal based on the acoustic path between the loudspeaker and the microphone.

8. The system of claim 7, further comprising a feedback cancellation unit configured to:
    determine an impulse response of the acoustic path based on input received by the microphone responsive to a calibration signal from the loudspeaker during a configuration mode; and
    set the feedback filter based on the impulse response.

9. The system of claim 1, wherein the feedback filter, the adaptive filter, and the signal combiner are integrated into a mobile device.

10. A method for in-vehicle communication, the method comprising:
    receiving an audio signal from a microphone of a vehicle;
    processing the audio signal to at least partially cancel a feedback portion of the audio signal and to at least partially cancel a second feedback portion of the audio signal, the feedback portion corresponding to an output of a loudspeaker of the vehicle and the second feedback portion corresponding to a second output of a second loudspeaker of the vehicle, wherein processing the audio signal includes:
        generating a filtered signal based on the audio signal;
        generating a second filtered signal based on the audio signal;
        generating a cancellation signal at least partially based on the filtered signal and the second filtered signal; and adaptively filtering the cancellation signal to generate a filtered cancellation signal; and combining the filtered cancellation signal with the audio signal to generate a modified audio signal.

11. The method of claim 10, further comprising processing the modified audio signal to generate an input signal for the loudspeaker and to generate a second input signal for the second loudspeaker.

12. The method of claim 11, wherein the microphone is at a first location proximate to a first occupant of the vehicle, wherein the loudspeaker is at a second location proximate to a second occupant of the vehicle, wherein the audio signal includes a voice portion that corresponds to speech of the first occupant, and wherein the input signal causes the loudspeaker to output a synthesized version of the speech of the first occupant at the second location proximate to the second occupant.

13. The method of claim 11, wherein combining the filtered cancellation signal with the audio signal attenuates one or more loudspeaker output signals that are received at the microphone without substantial attenuation of a voice portion of the audio signal.

14. The method of claim 11, wherein processing the modified audio signal includes adding a surround sound component for the loudspeaker to the modified audio signal.

15. The method of claim 14, wherein processing the modified audio signal includes adding a second surround sound component for the second loudspeaker to the modified audio signal.

16. The method of claim 11, wherein processing the audio signal includes:

filtering the audio signal at a first filter having a first transfer characteristic corresponding to a first feedback path between the loudspeaker and the microphone to generate the filtered signal;

filtering the audio signal at a second filter having a second transfer characteristic corresponding to a second feedback path between the second loudspeaker and the microphone to generate the second filtered signal; and combining the filtered signal and the second filtered signal.

17. The method of claim 11, wherein processing the audio signal includes:

delaying the audio signal with a first delay corresponding to a first feedback path between the loudspeaker and the microphone to generate the filtered signal;

delaying the audio signal with a second delay corresponding to a second feedback path between the second loudspeaker and the microphone to generate the second filtered signal; and combining the filtered signal and the second filtered signal.

18. A non-transitory computer-readable medium comprising instructions for in-vehicle communication, the instructions, when executed by a processor, cause the processor to perform operations comprising:

processing an audio signal from a microphone of a vehicle to at least partially cancel a feedback portion of the audio signal and to at least partially cancel a second feedback portion of the audio signal, the feedback portion corresponding to an output of a loudspeaker of the vehicle and the second feedback portion corresponding to a second output of a second loudspeaker of the vehicle, wherein processing the audio signal includes:

generating a filtered signal;

generating a second filtered signal based on the audio signal;

generating a cancellation signal at least partially based on the filtered signal and the second filtered signal; and adaptively filtering the cancellation signal to generate a filtered cancellation signal; and combining the filtered cancellation signal with the audio signal to generate a modified audio signal.

19. The non-transitory computer-readable medium of claim 18, the operations further comprising processing the modified audio signal to generate an input signal for the loudspeaker and to generate a second input signal for the second loudspeaker.

20. The non-transitory computer-readable medium of claim 19, wherein combining the filtered cancellation signal with the audio signal attenuates one or more loudspeaker output signals that are received at the microphone without substantial attenuation of a voice portion of the audio signal.

21. An apparatus for in-vehicle communication, the apparatus comprising:

means for processing an audio signal from a microphone of a vehicle to at least partially cancel a feedback portion of the audio signal, the feedback portion corresponding to an output of a loudspeaker of the vehicle and to a second output of a second loudspeaker of the vehicle, the means for processing including:

means for generating a filtered signal;

second means for generating a second filtered signal;

means for generating a cancellation signal at least partially based on the filtered signal and the second filtered signal; and means for adaptively filtering the cancellation signal to generate a filtered cancellation signal; and means for combining the filtered cancellation signal with the audio signal to generate a modified audio signal.

22. The apparatus of claim 21, wherein combining the filtered cancellation signal with the audio signal attenuates one or more loudspeaker output signals that are received at the microphone without substantial attenuation of a voice portion of the audio signal.

23. The system of claim 1, further comprising:

a signal combiner coupled to an output of the feedback filter and coupled to a second output of the second feedback filter; and a delay element coupled to a third output of the signal combiner and coupled to an input of the adaptive filter.

24. The system of claim 1, further comprising a third feedback filter configured to process the audio signal responsive to a third feedback path between a third loudspeaker and the microphone, and wherein the adaptive filter is further coupled to the third feedback filter.

* * * * *